(12) United States Patent
Yoon et al.

(10) Patent No.: US 12,356,229 B2
(45) Date of Patent: Jul. 8, 2025

(54) FEDERATED LEARNING DEVICE INTERWORKING WITH MOBILE CORE SYSTEM AND METHOD THEREOF

(71) Applicant: ELECTRONICS AND TELECOMMUNICATIONS RESEARCH INSTITUTE, Daejeon (KR)

(72) Inventors: Seung Hyun Yoon, Daejeon (KR); Tae Yeon Kim, Daejeon (KR); Seung Jae Shin, Daejeon (KR); Hong Seok Jeon, Daejeon (KR); Chung Lae Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 463 days.

(21) Appl. No.: 17/716,114

(22) Filed: Apr. 8, 2022

(65) Prior Publication Data

US 2023/0171630 A1    Jun. 1, 2023

(30) Foreign Application Priority Data

Nov. 30, 2021   (KR) .................. 10-2021-0169058

(51) Int. Cl.
*H04W 24/10*    (2009.01)
*G06N 20/00*    (2019.01)
(Continued)

(52) U.S. Cl.
CPC ............ *H04W 24/10* (2013.01); *G06N 20/00* (2019.01); *H04W 40/02* (2013.01); *H04W 76/10* (2018.02); *H04W 76/30* (2018.02)

(58) Field of Classification Search
CPC ...... H04W 24/10; H04W 40/02; H04W 76/10; H04W 76/30; H04W 40/24; G06N 20/00; G06N 20/20; H04L 67/303; H04L 67/51
See application file for complete search history.

(56) References Cited

U.S. PATENT DOCUMENTS 9,882,724 B2    1/2018  Hyun et al.
11,443,245 B1 *  9/2022  Du .................... G06N 20/00
(Continued)

FOREIGN PATENT DOCUMENTS

KR         101942892 B1    1/2019
KR       1020210051604 A   5/2021
(Continued)

OTHER PUBLICATIONS

Bing Luo et al., "Cost-Effective Federated Learning Design", IEEE INFOCOM 2021—IEEE Conference on Computer Communications, Dec. 15, 2020.

*Primary Examiner* — Pao Sinkantarakorn
*Assistant Examiner* — Kabir U Jahangir
(74) *Attorney, Agent, or Firm* — Rabin & Berdo, P.C.

(57) ABSTRACT

The present invention related to a method for federated learning method interworking with a mobile core system, the method comprising: querying terminal information of each individual terminal among a plurality of terminals; querying network performance information; selecting participating terminals among the plurality of terminals on the basis of the terminal information and the network performance information; transmitting respective parameters to the participating terminals and requesting local learning; and integrating the parameters.

16 Claims, 11 Drawing Sheets

(51) Int. Cl.
      *H04W 40/02*     (2009.01)
      *H04W 76/10*     (2018.01)
      *H04W 76/30*     (2018.01)

(56) References Cited

U.S. PATENT DOCUMENTS

| | | | |
|---|---|---|---|
| 2018/0019877 A1 | 1/2018 | Koo | |
| 2019/0385043 A1* | 12/2019 | Choudhary | G06F 13/4213 |
| 2020/0027033 A1* | 1/2020 | Garg | G06F 17/18 |
| 2020/0151482 A1 | 5/2020 | Park | |
| 2022/0237508 A1* | 7/2022 | Shaloudegi | G06N 3/045 |
| 2022/0398500 A1* | 12/2022 | Singhal | G06N 3/098 |
| 2024/0039807 A1* | 2/2024 | Yue | H04L 41/145 |
| 2024/0152768 A1* | 5/2024 | Butt | G06F 9/5094 |
| 2024/0251298 A1* | 7/2024 | Guo | H04W 24/02 |

FOREIGN PATENT DOCUMENTS

| | | |
|---|---|---|
| KR | 1020210066754 A | 6/2021 |
| KR | 1020210080756 A | 7/2021 |
| KR | 20210121915 A | 10/2021 |
| KR | 1020210132500 A | 11/2021 |

\* cited by examiner

FEDERATED LEARNING DEVICE INTERWORKING WITH MOBILE CORE SYSTEM AND METHOD THEREOF

CROSS REFERENCE TO RELATED APPLICATION

The present application claims priority to Korean Patent Application No. 10-2021-0169058, filed Nov. 30, 2021, the entire contents of which is incorporated herein for all purposes by this reference.

BACKGROUND OF THE INVENTION

Field of the Invention

The present disclosure relates to a federated learning device and a method thereof and, more particularly, to technology for a federated learning device interworking with a mobile core system and a method thereof.

Description of the Related Art

Learning of artificial intelligence is an operation that uses significant amounts of data and many resources, and in order to shorten learning time, a distributed learning method using a high-performance server or a plurality of servers in a cloud environment is widely used. In general, the distributed learning is conducted by a central parameter server that receives an update value of a parameter that is locally learned in each server, integrates the received parameters, and transmits the integrated parameters back to each server, and each server repeats a procedure of performing the local learning operation with the parameter. Recently, attempts to increase learning speed and development of methods for realizing the learning speed are underway by disposing a plurality of parameter servers or providing the above-described functions in network devices.

The distributed learning as described above is premised on an environment in which data is generally collected in one place, for example, in the cloud, and all servers participating in the learning are able to access and use such data in common. However, recently, due to a reason that data gathering in one place causes excessive consumption of network resources and time, or a reason that an infringement of privacy occurs, a method of learning without gathering the data in one place has been attempted, and this learning method is commonly referred to as federated learning.

Currently, various architectures and methods for the federated learning method are being studied, but in a fundamental architecture, the federated learning is operated by using the above-mentioned central parameter server that collects, updates, and shares parameters of a plurality of remote terminals.

When the federated learning is operated at a scale, for example, a scale of less than 1,000 terminals, of the distributed learning in the cloud, a problem of data bias to be overcome or a problem of transmission delay should be solved. Algorithms are being studied so that when the number of terminals rapidly increases to 10,000 or more and instability of each terminal or temporary interruption of connection is expected, all terminals are not allowed to be involved in learning each iteration, but only some stable terminals having good network performance or computational performance are allowed to participate in the learning. In this case, in order to optimize the learning efficiency, a method for selecting local terminals participating in the learning each iteration and an optimization method for adjusting and determining the number of local updates performed in the local terminals are being studied. In particular, when the local terminals are configured in a form where participation is free, a security problem may be added, and an issue of determining the reliability of the terminals may additionally occur.

The most serious problem in such an environment is that a network and computational performance for each local terminal, and the reliability of each terminal should be identified indirectly in an application layer. That is, the condition is that the resources or reliability of each terminal should be determined independently through other methods, and users have to take risks of errors occurring any time and a method should be devised in response to those errors. In addition, parameter transmission/reception performance has a very significant effect on the learning speed, yet in general, end-to-end network performance or network performance of each terminal is information difficult to acquired. Accordingly, the information should be indirectly inferred on the basis of the measurement of the application layer and the periodic connectivity.

In a case of an algorithm of current federated learning, since the algorithm is devised on the basis of information obtained in an inaccurate and non-standard method, there is a limit to achieving optimal efficiency, and there is a problem of causing significant amounts of time and cost in learning and causing errors to occur.

SUMMARY OF THE INVENTION

An objective of the present disclosure is to provide a federated learning method in which terminal information and network performance information of each individual terminal are queried by using a mobile core, participating terminals are selected on the basis of the terminal information and the network performance information, and parameters are integrated, so that the terminal information and the network performance are queried from a network when selecting the local terminals to participate in each iteration, whereby a federated learning algorithm may be performed on the basis of accurate information rather than guessed information.

Another objective of the present disclosure is to provide a federated learning method in which terminal information and network performance information, which are required for terminal selection, are integrated in a mobile core by using an AI support function (AISF) of the mobile core, so as to enable a parameter server to query the terminal information and the network performance information simultaneously.

Other objectives and advantages of the present disclosure may be understood by the following description, and will become more clearly understood by the examples of the present disclosure. Further, it will be readily apparent that the objectives and advantages of the present disclosure may be realized by the means and combinations thereof indicated in the appended claims.

According to an embodiment of the present invention, a federated learning method interworking with a mobile core system, the method comprising: querying terminal information of each individual terminal among a plurality of terminals; querying network performance information; selecting participating terminals among the plurality of terminals on the basis of the terminal information and the network performance information; transmitting respective parameters to the participating terminals and requesting local learning; and integrating the parameters.

According to an embodiment of the present invention, a federated learning method interworking with a mobile core system, the method further comprising, after the selecting of the participating terminals: requesting setting of respective routes between a parameter server and the participating terminals; and requesting releasing of the respective routes between the parameter server and the participating terminals.

According to an embodiment of the present invention, a federated learning method interworking with a mobile core system, the method further comprising, after the selecting of the participating terminals: requesting respectively dedicated slices when conducting federated learning; requesting respective slice connections between a parameter server and the participating terminals; and requesting releasing of the slices and releasing of the slice connections between the parameter server and the participating terminals.

According to an embodiment of the present invention, a federated learning method interworking with a mobile core system, wherein the querying of the terminal information of each individual terminal among the plurality of terminals queries at least one of performance, a device type, reliability, and resource information of each individual terminal.

According to an embodiment of the present invention, a federated learning method interworking with a mobile core system, the querying of the network performance information queries at least one of a network topology, the network performance information, access performance of each terminal, and connection stability information by network type.

According to an embodiment of the present invention, a federated learning method interworking with a mobile core system, the method further comprising: receiving, by a mobile core, a terminal information query request; querying the terminal information of each individual terminal among the plurality of terminals; querying the network performance information; integrating the terminal information and the network performance information; and transferring at least one of the integrated terminal information and the integrated network performance information to a parameter server.

According to an embodiment of the present invention, a federated learning method interworking with a mobile core system, the method further comprising: receiving, by the mobile core, a terminal information query request; querying the terminal information of each individual terminal among the plurality of terminals; querying the network performance information; integrating the terminal information and the network performance information; selecting the participating terminals on the basis of at least one of the integrated terminal information and the integrated network performance information; and transferring the list of the selected participating terminals to a parameter server.

According to an embodiment of the present invention, a federated learning method interworking with a mobile core system, the method further comprising, after the selecting of the participating terminals: setting at least one of respective routes and bandwidths between a parameter server and the participating terminals.

According to an embodiment of the present invention, a federated learning method interworking with a mobile core system, wherein the integrating of the terminal information and the network performance information integrates the terminal information and the network performance information by using AISF.

According to an embodiment of the present invention, a federated learning method interworking with a mobile core system, wherein the setting of at least one of the respective routes and bandwidths between a parameter server and the participating terminals sets at least one of the respective routes and bandwidths between the parameter server and the participating terminals by using AISF.

According to an embodiment of the present invention, a federated learning device interworking with a mobile core system, the device comprising: a plurality of terminals; a mobile core comprising terminal information and network performance information; and a parameter server configured to query the terminal information of each individual terminal among the plurality of terminals, query the network performance information, select participating terminals among the plurality of terminals on the basis of the terminal information and the network performance information, transmit respective parameters to the participating terminals, request local learning, and integrate the parameters.

According to an embodiment of the present invention, a federated learning device interworking with a mobile core system, wherein the parameter server requests setting of respective routes between the parameter server and the participating terminals, and requests releasing of the respective routes between the parameter server and the participating terminals.

According to an embodiment of the present invention, a federated learning device interworking with a mobile core system, wherein when conducting federated learning, the parameter server requests respectively dedicated slices, requests respective slice connections between the parameter server and the participating terminals, and requests releasing of the slices and releasing of the slice connections between the parameter server and the participating terminals.

According to an embodiment of the present invention, a federated learning device interworking with a mobile core system, wherein the parameter server queries at least one of performance, a device type, reliability, and resource information of each individual terminal.

According to an embodiment of the present invention, a federated learning device interworking with a mobile core system, wherein the parameter server queries at least one of a network topology, the network performance information, access performance of each terminal, and connection stability information by network type.

According to an embodiment of the present invention, a federated learning device interworking with a mobile core system, wherein the mobile core receives a terminal information query request, queries the terminal information of each individual terminal among the plurality of terminals, queries the network performance information, integrates the terminal information and the network performance information, and transfers at least one of the integrated terminal information and the integrated network performance information to the parameter server.

According to an embodiment of the present invention, a federated learning device interworking with a mobile core system, wherein the mobile core receives a terminal information query request, queries the terminal information of each individual terminal among the plurality of terminals, queries the network performance information, integrates the terminal information and the network performance information, selects the participating terminals on the basis of at least one of the integrated terminal information and the integrated network performance information, and transfers a list of the selected participating terminals to the parameter server.

According to an embodiment of the present invention, a federated learning device interworking with a mobile core system, wherein the mobile core sets at least one of respective routes and bandwidths between the parameter server and the participating terminals.

According to an embodiment of the present invention, a federated learning device interworking with a mobile core system, wherein the mobile core integrates the terminal information and the network performance information by using AISF.

According to an embodiment of the present invention, a federated learning device interworking with a mobile core system, wherein the mobile core sets at least one of the respective routes and bandwidths between the parameter server and the participating terminals by using AISF.

According to the exemplary embodiment of the present disclosure, participating terminals are selected on the basis of the terminal information and the network performance information, and the parameters are integrated, so that the terminal information and the network performance are queried from the network when selecting the local terminals to participate in each iteration, whereby the federated learning algorithm may be performed on the basis of the accurate information rather than the guessed information.

According to another exemplary embodiment of the present disclosure, the terminal information and the network performance information, which are required for terminal selection, are integrated in the mobile core by using the AISF of the mobile core, so as to enable the parameter server to query the terminal information and the network performance information simultaneously and inefficient parts may be removed, whereby more effective federated learning may be performed.

The effects of the present disclosure are not limited to the above-mentioned effects, and other effects that are not mentioned will be clearly understood by those skilled in the art from the following description.

DETAILED DESCRIPTION OF THE INVENTION

Figure 1:
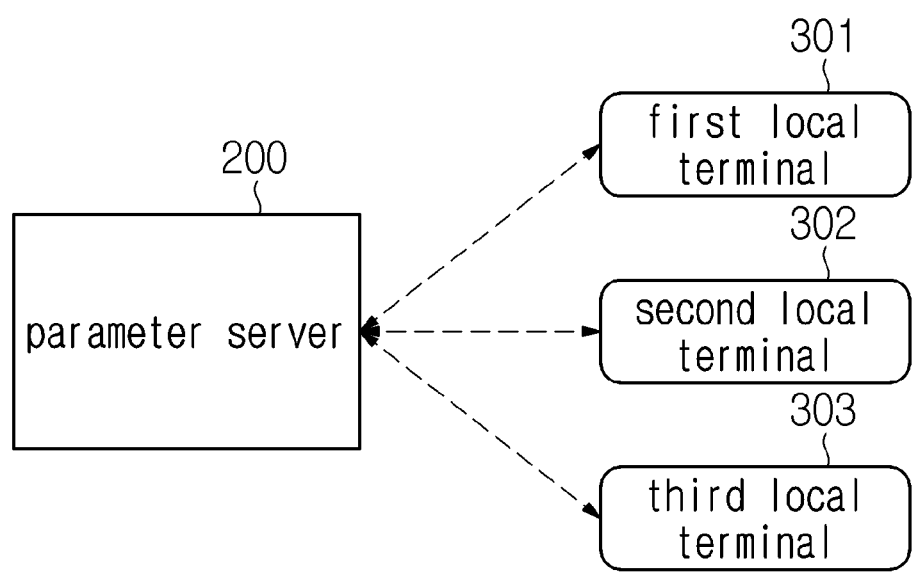
FIG. 1 is a view illustrating a configuration diagram of federated learning according to an exemplary embodiment of the present disclosure.

Hereinafter, embodiments of the present disclosure will be described in detail with reference to the accompanying drawings so that those of ordinary skill in the art to which the present disclosure pertains can easily implement them. However, the present disclosure may be implemented in several different forms and is not limited to the embodiments described herein.

In describing an embodiment of the present disclosure, if it is determined that a detailed description of a well-known configuration or function may obscure the gist of the present disclosure, a detailed description thereof will be omitted. And, in the drawings, parts not related to the description of the present disclosure are omitted, and similar reference numerals are attached to similar parts.

In the present disclosure, the components that are distinguished from each other are for clearly explaining each characteristic, and the components do not necessarily mean that the components are separated. That is, a plurality of components may be integrated to form one hardware or software unit, or one component may be distributed to form a plurality of hardware or software units. Accordingly, even if not specifically mentioned, such integrated or distributed embodiments are also included in the scope of the present disclosure.

In the present disclosure, components described in various embodiments do not necessarily mean essential components, and some may be optional components. Accordingly, an embodiment composed of a subset of components described in an embodiment is also included in the scope of the present disclosure. In addition, embodiments including other components in addition to components described in various embodiments are also included in the scope of the present disclosure.

In the present disclosure, terms such as first, second, etc. are used only for the purpose of distinguishing one component from other components, and unless otherwise specified, the order or importance between the components is not limited. Accordingly, within the scope of the present disclosure, a first component in one embodiment may be referred to as a second component in another embodiment, and similarly, a second component in one embodiment is referred to as a first component in another embodiment.

When a component of the present disclosure is referred to as being "connected" or "connected" to another component, it may be directly connected or connected to the other component, but it should be understood that other components may exist in between. On the other hand, when it is said that a certain element is "directly connected" or "directly connected" to another element, it should be understood that there is no other element in the middle.

In addition, in the present disclosure, the description of each drawing may be applied to different drawings unless one drawing showing an embodiment of the present disclosure corresponds to another drawing and an alternative embodiment.

Hereinafter, the present disclosure will be described in more detail with reference to the drawings.

FIG. 1 is a view illustrating a configuration diagram of federated learning according to an exemplary embodiment of the present disclosure.

Referring to FIG. 1, currently, various architectures and methods for the federated learning are being studied, but in a fundamental architecture, the method thereof is operated while collecting, updating, and sharing parameters between a plurality of remote terminals, i.e., local terminals in the views to be described below, by using the above-mentioned central parameter server.

A parameter server 200 transmits and receives data to and from a first local terminal 301, a second local terminal 302, and a third local terminal 303.

The first local terminal 301, the second local terminal 302, and the third local terminal 303 retain data and perform local learning.

Figure 2:
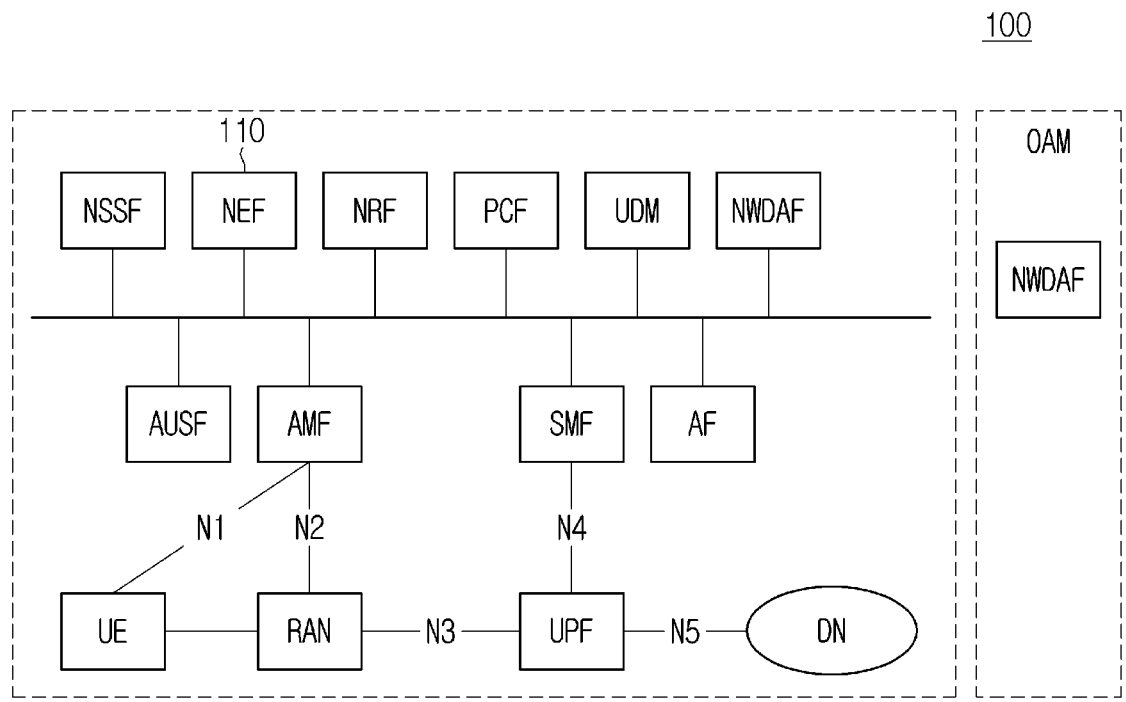
FIG. 2 is a view illustrating a 5G mobile core architecture according to the exemplary embodiment of the present disclosure.

FIG. 2 is a view illustrating a 5G mobile core architecture according to the exemplary embodiment of the present disclosure.

Referring to FIG. 2, a mobile core 100 includes a network exposure function (NEF) 110.

Currently, in the 5G mobile core system, various functions are defined as standards for communication network operation. The detailed configurations and functions in the views to be described below follow the content of the 5G standards, and since OAM and NSC are related to the procedures of the present disclosure, the OAM and NSC are separately indicated at a conceptual configuration level.

The 5G mobile core introduces the functions of NEF for safely exposing the provided services and service capabilities to inside or outside the system.

In the network exposure function (NEF) that is an open technology of 5G networks, functions are defined so as to provide information to the outside or receive a control request in a 5G mobile network. In such a 5G network open technology, methods of opening mobile core information, in addition to opening information on OAM (i.e., NMS, etc.) for operation of a network or information on MEC/NFV introduced into the network, has been proposed and discussed, so that some of the proposed methods are included in the requirements and the development of open standards is in progress.

The present disclosure proposes the method in which a parameter server for managing federated learning acquires network-related information through the NEF and transmits a control request to the network through the NEF when necessary. This proposal of the present disclosure may be equally applied not only to 5G mobile networks but also to 6G mobile networks to be developed in the future.

Figure 3:
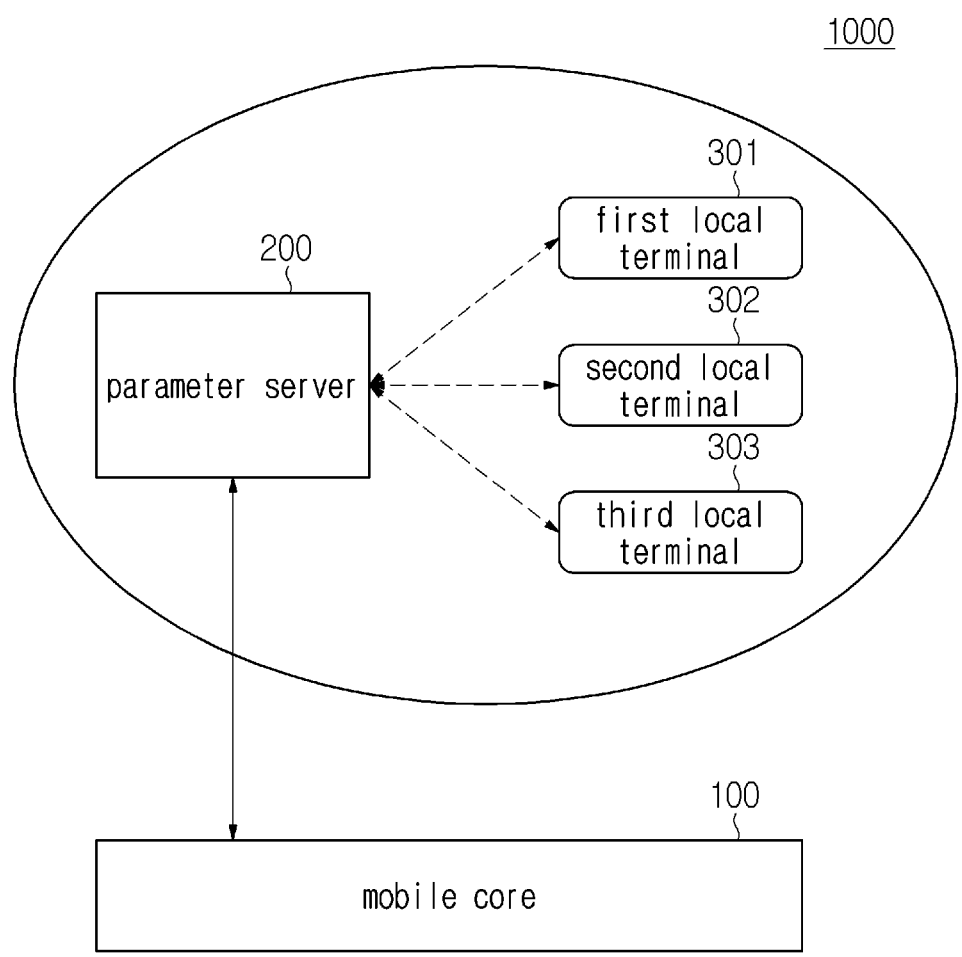
FIG. 3 is a view that illustrates interworking between a mobile core and a parameter server according to the exemplary embodiment of the present disclosure.

FIG. 3 is a view that illustrates interworking between a mobile core and a parameter server according to the exemplary embodiment of the present disclosure.

Referring to FIG. 3, a federated learning system with mobile core 1000 includes a mobile core 100, a parameter server 200, and a plurality of terminals. Here, the plurality of terminals includes a first local terminal 301, a second local terminal 302, and a third local terminal 303.

The parameter server 200 acquires terminal information and network performance information from the mobile core 100.

The mobile core 100 includes the terminal information and the network performance information.

The parameter server 200 is configured to query terminal information of each individual terminal among the plurality of terminals, query network performance information, select participating terminals from the plurality of terminals 300 on the basis of the terminal information and the network performance information, transmit respective parameters to the participating terminals, request local learning, and integrate the parameters.

The parameter server 200 requests setting of respective routes between the parameter server and the participating terminals, and requests releasing of the respective routes between the parameter server and the participating terminals.

When performing the federated learning, the parameter server 200 requests respectively dedicated slices, requests respective slice connections between the parameter server and the participating terminals, and requests releasing of the slices and releasing of the slice connections between the parameter server and the participating terminals.

The parameter server 200 queries at least one of performance, a device type, reliability, and resource information of each individual terminal.

The parameter server 200 queries at least one of a network topology, network performance information, access performance of each terminal, and connection stability information by network type.

The mobile core 100 is configured to receive a terminal information query request, query terminal information of each individual terminal among the plurality of terminals, query network performance information, integrate the terminal information and the network performance information, and transfer at least one of the integrated terminal information and the integrated network performance information to the parameter server.

The mobile core 100 is configured to receive the terminal information query request, query the terminal information of each individual terminal among the plurality of terminals, query the network performance information, integrate the terminal information and the network performance information, select participating terminals on the basis of at least one of the integrated terminal information and the integrated network performance information, and transfer a list of the selected participating terminals to the parameter server.

The mobile core 100 sets at least one of respective routes and bandwidths between the parameter server and the participating terminals.

The mobile core 100 integrates the terminal information and the network performance information by using AISF.

The mobile core 100 sets at least one of the respective routes and bandwidths between the parameter server and the participating terminals by using the AISF.

According to the present disclosure, the parameter server that manages federated learning queries terminal information and network performance from a network when selecting local terminals to participate each iteration, and performs an algorithm on the basis of accurate information rather than guessed information, whereby more effective federated learning may be performed.

First, with reference to the requirements and standard structure of the 5G mobile core, when organizing information that may be obtainable through NEF now or after the standardization is completed, the organized information is as follows.

Querying the terminal information will be described.

The terminal information includes performance and a device type of a specific terminal, and reliability and resource information of the terminal.

The terminal information may be utilized to determine local terminals participating in an update each iteration.

Relevant mobile core functions related to the terminal information may be, for example, NWDAF (i.e., UE behavior, UE mobility prediction, UE abnormal, Service experience, etc.), UDM, LMF, and AMF (related to network access information: M3IWF/TNGF, W-AGF, and TWI).

Querying the network performance will be described.

The network performance includes a topology, network performance information, access performance of each terminal, and connection stability by network type.

The network performance information may be utilized to determine the participating local terminals in an update each iteration, and determine an update period.

The mobile core functions related to the network performance information may be, for example, NWDAF (i.e., QoS, Network load, Communication Pattern, Congestion information, etc.), AMF (related to network connection information), AF (i.e., a topology), PCF, and SMF.

According to the present disclosure, the parameter server may be able to shorten or determine the transmission time through a request for respective routes and bandwidths of a network between the terminals and the parameter server itself, and may ultimately request dedicated slices for federated learning so as to promote improvement of the speed of the federated learning speed and the stability of the federated learning.

Figure 4:
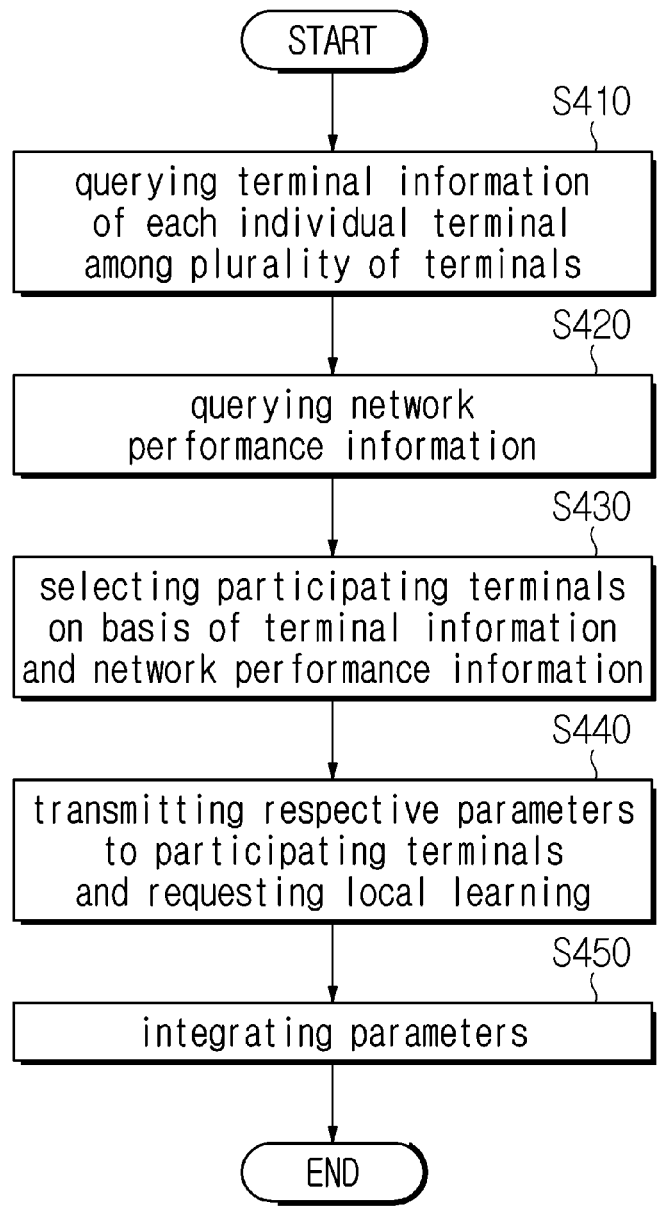
FIG. 4 is a view illustrating a fundamental process of a federated learning algorithm according to the exemplary embodiment of the present disclosure.

FIG. 4 is a view illustrating a fundamental process of a federated learning algorithm according to the exemplary embodiment of the present disclosure. The embodiment of the present disclosure is performed by a parameter server.

Referring to FIG. 4, in step S410, the parameter server queries terminal information of each individual terminal among the plurality of terminals.

In step S420, network performance information is queried.

In step S430, participating terminals are selected from among the plurality of terminals on the basis of the terminal information and the network performance information.

In step S440, parameters are respectively transmitted to the participating terminals and local learning is requested.

In step S450, the parameters are integrated.

According to the present disclosure, when selecting terminals that participate each iteration in federated learning, the participating terminals may be selected by querying terminal information and network performance information thereof through the NEF of the mobile core.

Figure 5:
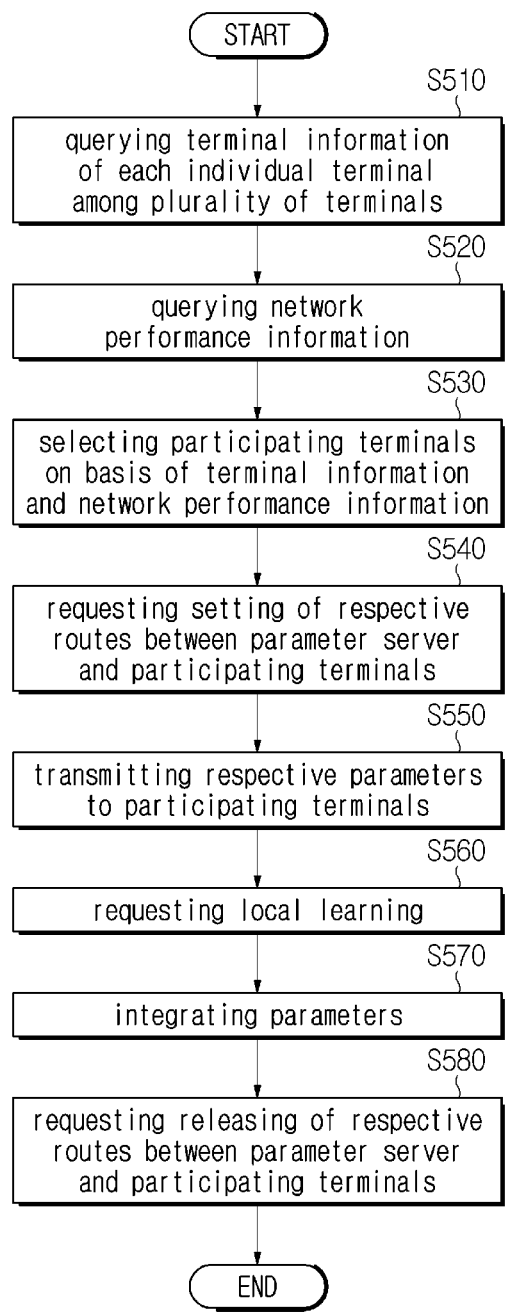
FIG. 5 is a view illustrating a process of setting and releasing respective routes between a server and each terminal in the federated learning algorithm according to the exemplary embodiment of the present disclosure.

FIG. 5 is a view illustrating a process of setting and releasing respective routes between a server and each terminal in the federated learning algorithm according to the exemplary embodiment of the present disclosure. The embodiment of the present disclosure is performed by the parameter server.

Referring to FIG. 5, in step S510, the parameter server queries terminal information of each individual terminal among the plurality of terminals.

In step S520, network performance information is queried.

In step S530, participating terminals are selected from among the plurality of terminals on the basis of the terminal information and the network performance information.

In step S540, setting of respective routes between the parameter server and the participating terminals is requested.

In step S550, parameters are respectively transmitted to the participating terminals.

In step S560, local learning is requested.

In step S570, the parameters are integrated.

In step S580, releasing of the respective routes between the parameter server and the participating terminals is requested.

According to the present disclosure, in addition to the procedure for selecting the participating terminals by querying the terminal information and network performance information, the bandwidths and connection stability may be secured by requesting setting of the respective routes between the server and the terminals, which require a significant amount of data transmission.

Figure 6:
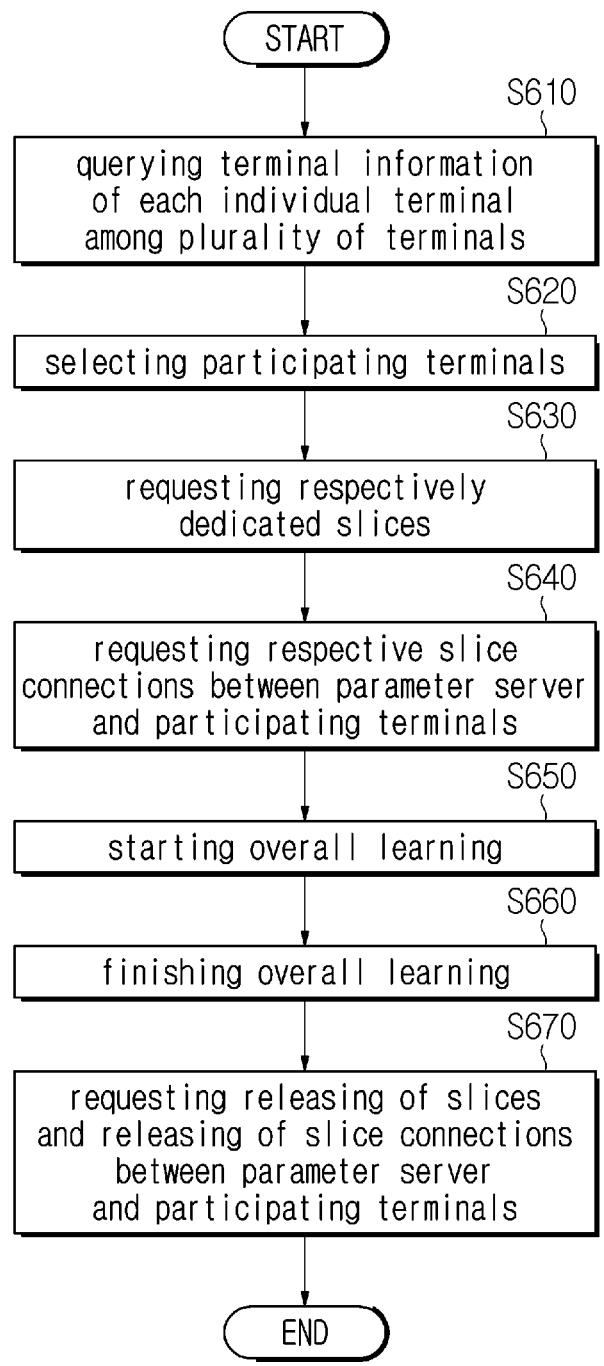
FIG. 6 is a view illustrating a process of connecting and releasing a slice between the server and each terminal in the federated learning algorithm according to the exemplary embodiment of the present disclosure.

FIG. 6 is a view illustrating a process of connecting and releasing a slice between the server and each terminal in the federated learning algorithm according to the exemplary embodiment of the present disclosure. The embodiment of the present disclosure is performed by the parameter server.

Referring to FIG. 6, in step S610, the parameter server queries terminal information of each individual terminal among the plurality of terminals. Network performance information is queried.

In step S620, participating terminals are selected from among the plurality of terminals on the basis of the terminal information and the network performance information.

In step S630, respectively dedicated slices are requested.

In step S640, respective slice connections between the parameter server and the participating terminals are requested.

In step S650, overall learning is started.

In step S660, the overall learning is finished.

Here, between the start and the finish of the overall learning, multiple iteration of operations, for example, parameter transmission, local learning, parameter integration, and the like are repeatedly performed.

In step S670, releasing of the slices and releasing of the slice connections between the parameter server and the participating terminals are requested.

According to the present disclosure, in a future network (i.e., 5G/6G) in which slice opening is available, dedicated slices are requested and opened before learning starts, federated learning is performed through the dedicated and opened slices, and the slices may be released after the learning is finished.

The present disclosure may be possibly configured in a service subscription form as well through a service portal of the traditional BSS/OSS rather than through the NEF. In the present disclosure, it is assumed that there is provided a network slice controller (NSC) that controls slices in OAM. The NSC refers to a slice management system having a lifecycle management function to generate, maintain, and delete the slices, and the detailed function is considered to be at a level commonly discussed in a corresponding field of the related art.

Figure 7:
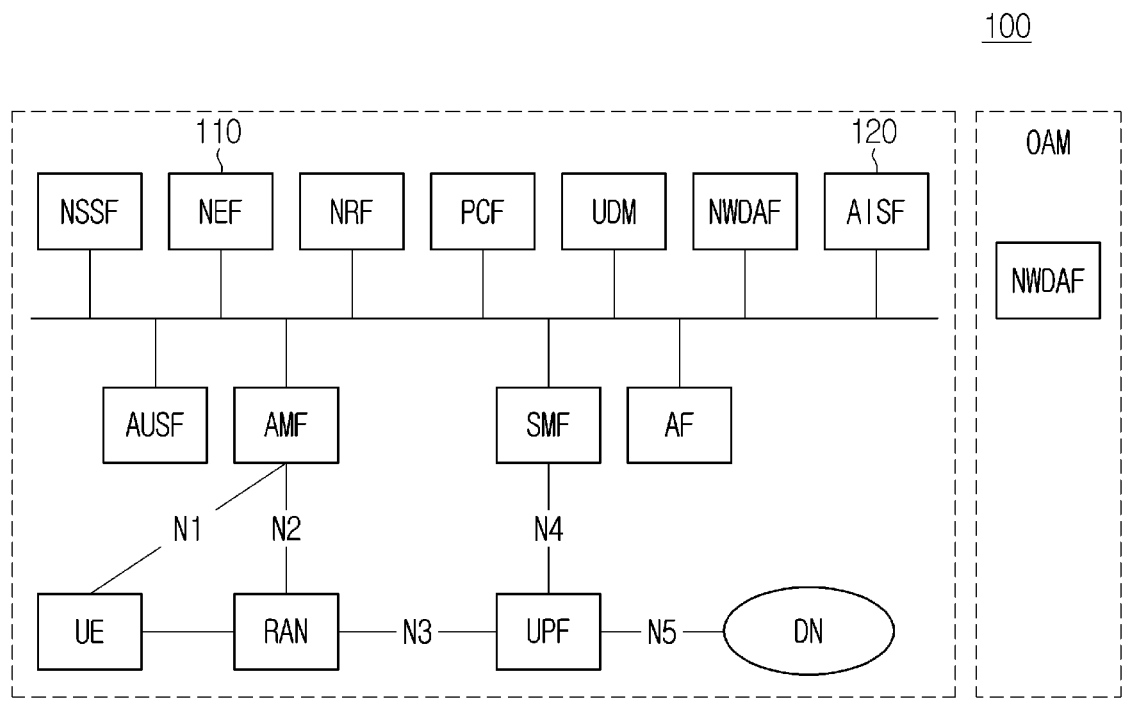
FIG. 7 is a view illustrating an extended mobile core architecture according to the exemplary embodiment of the present disclosure.

FIG. 7 is a view illustrating an extended mobile core architecture according to the exemplary embodiment of the present disclosure.

Referring to FIG. 7, the mobile core 100 includes an NEF 110 and an AISF 120.

The processes corresponding to FIGS. 4 to 6 of the present disclosure are tasks of selecting terminals by querying terminal information or network performance information through a mobile core. The tasks are somewhat inefficient because of having to perform multiple query procedures and having to perform its own selection procedures each iteration.

The present disclosure proposes to extend the mobile core as follows.

The AI support function (AISF) 120 proposed in the present disclosure is devised to collectively integrate information necessary for the terminal selection of federated learning and provide functions through the NEF 110. The AISF 120 defines several extended functions. The AISF will be described later with reference to FIGS. 8 to 10.

Figure 8:
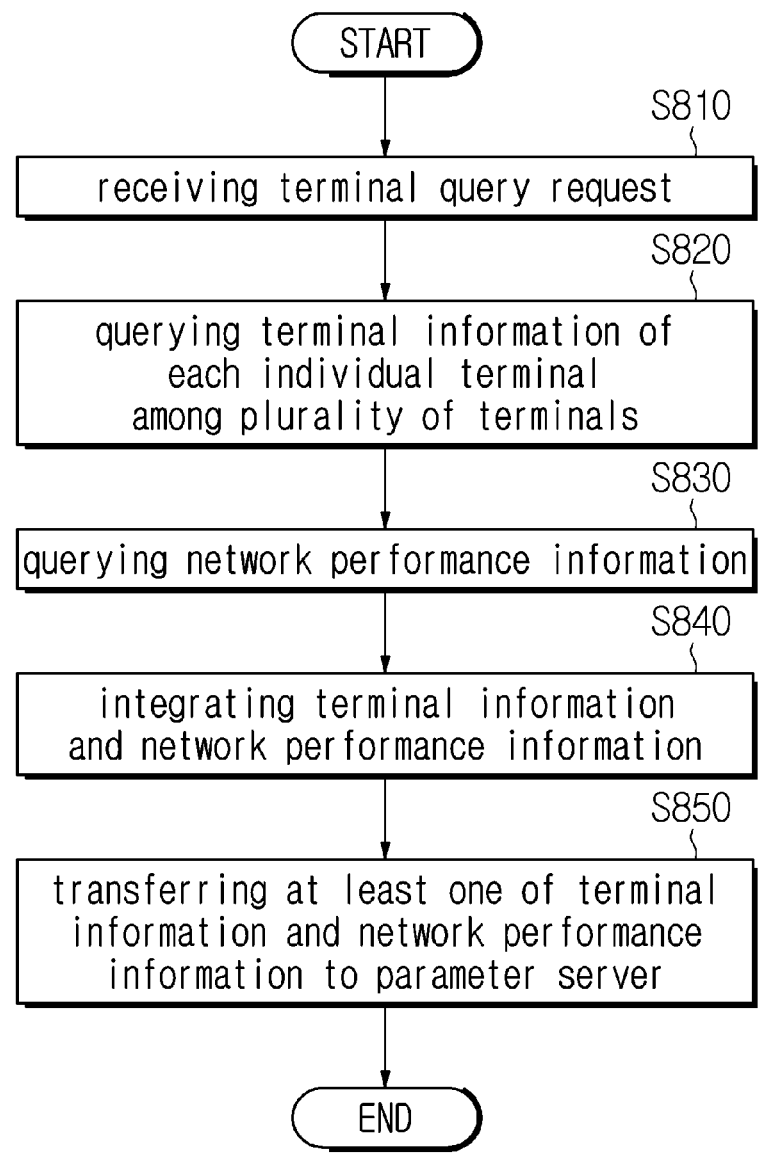
FIG. 8 is a view illustrating a process of querying terminal information and network information in the extended mobile core architecture according to the exemplary embodiment of the present disclosure.

FIG. 8 is a view illustrating a process of querying terminal information and network information in the extended mobile core architecture according to the exemplary embodiment of the present disclosure. The embodiment of the present disclosure is performed by the mobile core.

Referring to FIG. 8, in step S810, the mobile core receives a terminal information query request. Specifically, the terminal information query request is received by the AISF via the NEF. Although omitted in FIG. 8, an entity that requests the information is the parameter server, which is the subject of normal federated learning.

In step S820, terminal information of each individual terminal among the plurality of terminals is queried.

The terminal information includes information obtained from NWDAF and UDM.

In step S830, network performance information is queried.

The network performance information includes information obtained from NWDAF, AMF, and SMF.

In step S840, the terminal information and the network performance information are integrated.

Specifically, the terminal information and the network performance information are integrated by using the AISF.

In step S850, at least one of the integrated terminal information and the integrated network performance information is transferred to the parameter server.

According to the present disclosure, the parameter server may query the information at once by querying and integrating the terminal information and network performance information necessary for the terminal selection inside the mobile core by using the AISF. In this case, there is an advantage in that the parameter server does not need to perform multiple queries.

Figure 9:
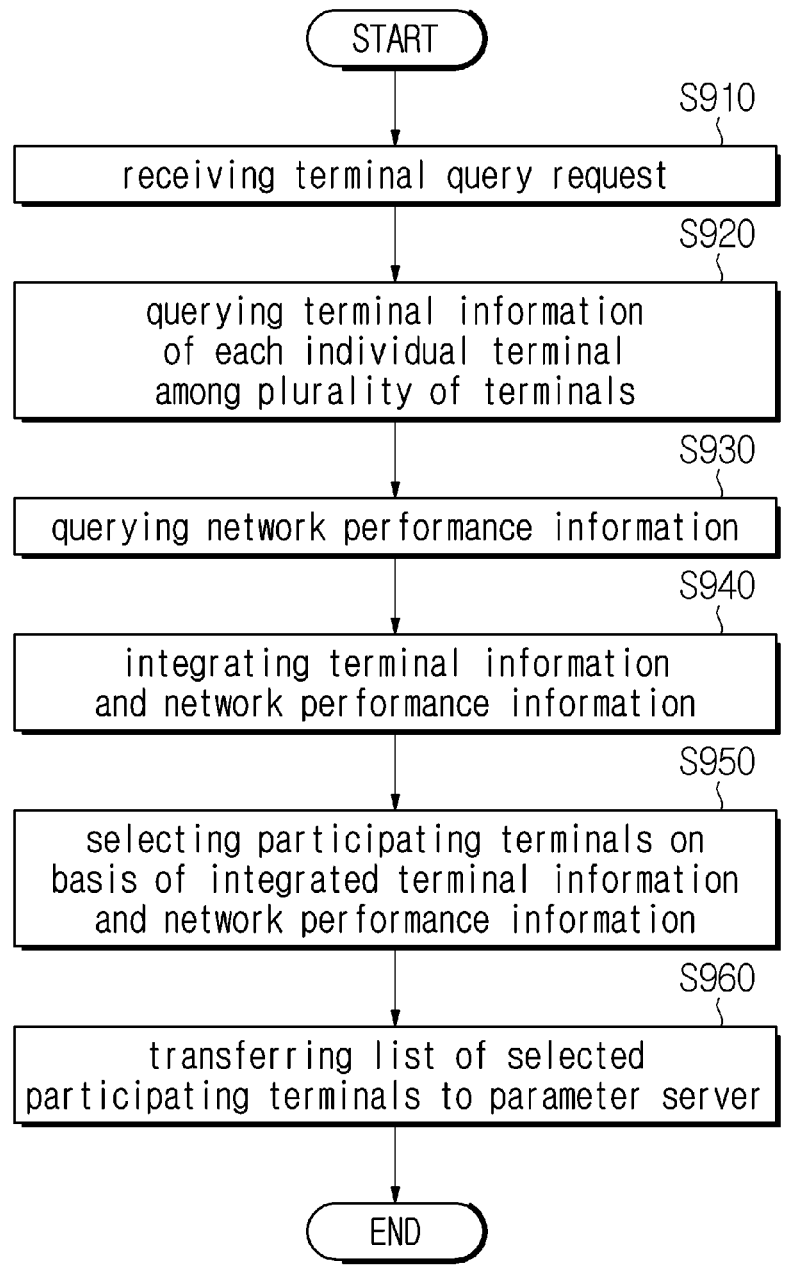
FIG. 9 is a view illustrating a process of determining, for a reply, terminals to participate in the learning in the extended mobile core architecture according to the exemplary embodiment of the present disclosure.

FIG. 9 is a view illustrating a process of determining, for a reply, terminals to participate in the federated learning in the extended mobile core architecture according to the exemplary embodiment of the present disclosure. The embodiment of the present disclosure is performed by the mobile core.

Referring to FIG. 9, in step S910, the mobile core receives a terminal information query request. Specifically, the terminal information query request is received by the AISF through the NEF.

In step S920, the terminal information of each individual terminal among the plurality of terminals is queried.

Here, the terminal information includes information from NWDAF and UDM.

In step S930, network performance information is queried.

Here, the network performance information includes information from NWDAF, AMF, and SMF.

In step S940, the terminal information and the network performance information are integrated.

Specifically, the terminal information and the network performance information are integrated by using the AISF.

In step S950, participating terminals are selected on the basis of at least one of the integrated terminal information and the integrated network performance information.

In step S960, a list of the selected participating terminals is transferred to the parameter server.

According to the present disclosure, the parameter server may request the terminal selection, and the AISF of the mobile core may determine, for the reply, the terminals to participate in the federated learning on the basis of the query results of the internal information.

Figure 10:
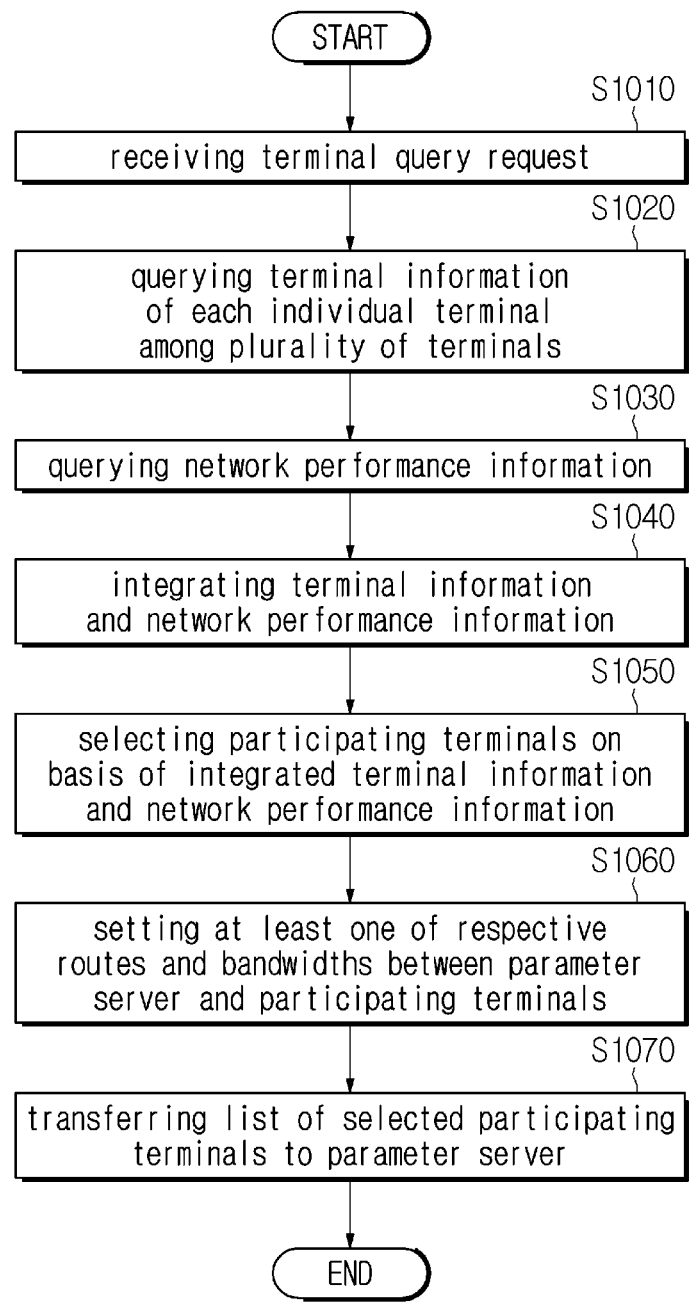
FIG. 10 is a view illustrating a process of setting respective routes and bandwidths between the server and each terminal in the extended mobile core architecture according to the exemplary embodiment of the present disclosure.

FIG. 10 is a view illustrating a process of setting respective routes and bandwidths between the server and each terminal in the extended mobile core architecture according to the exemplary embodiment of the present disclosure. The embodiment of the present disclosure is performed by the mobile core.

Referring to FIG. 10, in step S1010, the mobile core receives a terminal information query request. Specifically, the terminal information query request is received by the AISF through the NEF.

In step S1020, the terminal information of each individual terminal among the plurality of terminals is queried.

Here, the terminal information includes information from NWDAF and UDM.

In step S1030, network performance information is queried.

Here, the network performance information includes information from NWDAF, AMF, and SMF.

In step S1040, the terminal information and the network performance information are integrated.

Specifically, the terminal information and the network performance information are integrated by using the AISF.

In step S1050, participating terminals are selected on the basis of at least one of the integrated terminal information and the integrated network performance information.

In step S1060, at least one of respective routes and bandwidths between the parameter server and the participating terminals is set.

In step S1070, the list of the selected participating terminals is transferred to the parameter server.

According to the present disclosure, the AISF of the mobile core not only determines the participating terminals, but also requests the respective routes and bandwidths between the parameter server and the participating terminals to other mobile cores or OAMs to secure network connection and resources.

Figure 11:
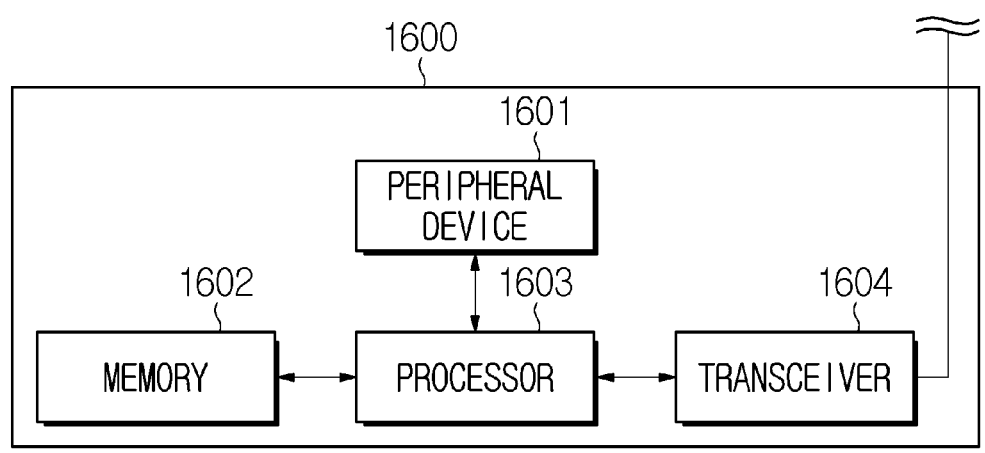
FIG. 11 is a view illustrating the parameter server according to the exemplary embodiment of the present disclosure.

FIG. 11 is a view illustrating the parameter server according to the exemplary embodiment of the present disclosure.

Referring to FIG. 11, the parameter server will be described. The parameter server includes a device 1600. The device 1600 may include a memory 1602, a processor 1603, a transceiver 1604, and a peripheral device 1601. In addition, as an example, the device 1600 may further include other components, and is not limited to the above-described exemplary embodiment.

More specifically, the device 1600 of FIG. 11 may be an exemplary hardware/software architecture, such as a parameter server, a federated learning configuration server, and the like. In this case, as an example, the memory 1602 may be a non-removable memory or a removable memory. In addition, as an example, the peripheral device 1601 may include a display, GPS, or other peripheral devices, and is not limited to the above-described exemplary embodiment.

In addition, as an example, the above-described device 1600 may include a communication circuit similar to the transceiver 1604, and may communicate with an external device on the basis of the communication circuit.

In addition, as an example, the processor 1603 may be at least one or more of a general-purpose processor, a digital signal processor (DSP), a DSP core, a controller, a microcontroller, application specific integrated circuits (ASICs), field programmable gate array (FPGA) circuits, any other types of integrated circuits (IC), and one or more microprocessors associated with a state machine. That is, the processor 1603 may be a hardware/software architecture that performs a control role for controlling the above-described device 1600.

In this case, the processor 1603 may execute computer-executable instructions stored in the memory 1602 in order to perform various essential functions of the parameter server. For example, the processor 1603 may control at least one of signal coding, data processing, power control, input/output processing, and communication operations. In addition, the processor 1603 may control a physical layer, a MAC layer, and an application layer. In addition, as an example, the processor 1603 may perform authentication and security procedures at an access layer and/or the application layer, and the like, and is not limited to the above-described exemplary embodiment.

As an example, the processor 1603 may communicate with other devices through the transceiver 1604. As an example, the processor 1603 may control the parameter server to communicate with other external devices through a network and through execution of computer-executable instructions. That is, the communication performed in the present disclosure may be controlled. As an example, other external devices may have various types of servers. For example, the transceiver 1604 may transmit an RF signal through an antenna, and may transmit the signal on the basis of various communication networks.

In addition, as an example, MIMO technology, beamforming, and the like may be applied as antenna technology, and the present disclosure is not limited to the above-described exemplary embodiment. In addition, the signal transmitted and received through the transceiver 1604 may be modulated and demodulated to be controlled by the processor 1603, and the present disclosure is not limited to the above-described exemplary embodiment.

The various embodiments of the present disclosure do not list all possible combinations, but are intended to illustrate representative aspects of the present disclosure, matters described in various embodiments may be applied independently or in combination of two or more.

In addition, various embodiments of the present disclosure may be implemented by hardware, firmware, software, or a combination thereof. For implementation by hardware, one or more application specific Integrated Circuits (ASICs), Digital Signal Processors (DSPs), Digital Signal Processing Devices (DSPDs), Programmable Logic Devices (PLDs), Field Programmable Gate Arrays (FPGAs), general processor, a controller, a microcontroller, a microprocessor, and the like. For example, it may take various forms including the general-purpose processor. It is apparent that hardware may be disclosed in combination of one or more.

The scope of the present disclosure includes software or machine-executable instructions (eg, operating system, application, firmware, program, etc.) that cause an operation according to the method of various embodiments to be executed on a device or computer, and such software or and non-transitory computer-readable media in which instructions and the like are stored and executed on a device or computer.

The present disclosure described above can be various substitutions, modifications and changes within the scope that does not depart from the technical spirit of the present disclosure for those of ordinary skill in the art to which the present disclosure pertains, so the scope of the present disclosure is It is not limited by one embodiment and the accompanying drawings.

What is claimed is:

1. A federated learning method interworking with a mobile core system, the method comprising:
   querying terminal information of each individual terminal among a plurality of terminals;
   querying network performance information;
   selecting participating terminals among the plurality of terminals on the basis of the terminal information and the network performance information;
   transmitting respective parameters to the participating terminals and requesting local learning; and
   integrating the parameters,
   the method further comprising:
   receiving, by a mobile core, a terminal information query request;
   querying the terminal information of each individual terminal among the plurality of terminals;
   querying the network performance information;
   integrating the terminal information and the network performance information; and
   transferring at least one of the integrated terminal information and the integrated network performance information to a parameter server,
   wherein the integrating of the terminal information and the network performance information integrates the terminal information and the network performance information by using AISF (Artificial Intelligence support function).

2. The method of claim 1, further comprising, after the selecting of the participating terminals:
   requesting setting of respective routes between the parameter server and the participating terminals; and
   requesting releasing of the respective routes between the parameter server and the participating terminals.

3. The method of claim 1, further comprising, after the selecting of the participating terminals:
   requesting respectively dedicated slices when conducting federated learning;
   requesting respective slice connections between the parameter server and the participating terminals; and
   requesting releasing of the slices and releasing of the slice connections between the parameter server and the participating terminals.

4. The method of claim 1, wherein the querying of the terminal information of each individual terminal among the plurality of terminals queries at least one of performance, a device type, reliability, and resource information of each individual terminal.

5. The method of claim 1, wherein the querying of the network performance information queries at least one of a network topology, the network performance information, access performance of each terminal, and connection stability information by network type.

6. The method of claim 1, further comprising:
   further selecting the participating terminals on the basis of at least one of the integrated terminal information and the integrated network performance information; and
   transferring the list of the selected participating terminals to the parameter server.

7. The method of claim 1, further comprising, after the selecting of the participating terminals:
   setting at least one of respective routes and bandwidths between the parameter server and the participating terminals.

8. The method of claim 7, wherein the setting of at least one of the respective routes and bandwidths between a parameter server and the participating terminals sets at least one of the respective routes and bandwidths between the parameter server and the participating terminals by using AISF (Artificial Intelligence support function).

9. A federated learning device interworking with a mobile core system, the device comprising:
- a plurality of terminals;
- a mobile core comprising terminal information and network performance information; and
- a parameter server configured to query the terminal information of each individual terminal among the plurality of terminals, query the network performance information, select participating terminals among the plurality of terminals on the basis of the terminal information and the network performance information, transmit respective parameters to the participating terminals, request local learning, and integrate the parameters,
- wherein the mobile core receives a terminal information query request, queries the terminal information of each individual terminal among the plurality of terminals, queries the network performance information, integrates the terminal information and the network performance information, and transfers at least one of the integrated terminal information and the integrated network performance information to the parameter server,
- and wherein the mobile core sets at least one of the respective routes and bandwidths between the parameter server and the participating terminals by using AISF (Artificial Intelligence support function).

10. The device of claim 9, wherein the parameter server requests setting of respective routes between the parameter server and the participating terminals, and requests releasing of the respective routes between the parameter server and the participating terminals.

11. The device of claim 9, wherein when conducting federated learning, the parameter server requests respectively dedicated slices, requests respective slice connections between the parameter server and the participating terminals, and requests releasing of the slices and releasing of the slice connections between the parameter server and the participating terminals.

12. The device of claim 9, wherein the parameter server queries at least one of performance, a device type, reliability, and resource information of each individual terminal.

13. The device of claim 9, wherein the parameter server queries at least one of a network topology, the network performance information, access performance of each terminal, and connection stability information by network type.

14. The device of claim 9, wherein the mobile core further selects the participating terminals on the basis of at least one of the integrated terminal information and the integrated network performance information, and transfers a list of the selected participating terminals to the parameter server.

15. The device of claim 9, wherein the mobile core sets at least one of respective routes and bandwidths between the parameter server and the participating terminals.

16. The device of claim 15, wherein the mobile core sets at least one of the respective routes and bandwidths between the parameter server and the participating terminals by using AISF (Artificial Intelligence support function).

* * * * *